UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

BLUE AZO DYE.

SPECIFICATION forming part of Letters Patent No. 601,859, dated April 5, 1898.

Application filed January 4, 1893. Serial No. 457,259. (Specimens.)

*To all whom it may concern:*

Be it known that I, CHRISTIAN RUDOLPH, a subject of the Emperor of Germany, and a resident of Offenbach, near Frankfort-on-the-Main, Germany, (assignor to the firm of K. OEHLER, of said Offenbach,) have invented new and useful Improvements in Blue Azo Dyestuffs, of which the following is a specification.

The way of producing the new dyestuff consists in combining tetrazo diphenyl or ditolyl chlorid with one molecule of amidoöxy-alpha-naphthalene-disulfo-acid and with one molecule of dioxynaphthalene 2.6.

For example, eleven parts of tolidin or the corresponding quantity of benzidin are dissolved in seventy-five parts of muriatic acid of 12.5 per cent. and five hundred parts of water. After cooling to 0° seven parts of sodium nitrite are added and the whole is poured into a solution of twenty parts of the potassium salt of amidoöxy-alpha-napthalene-disulfo-acid in seven hundred parts of soda-lye of two per cent. In this manner a so-called "intermediate" compound is formed which can be transformed into the new dyestuff by further treating it with a solution of 8.5 parts of dioxynaphthalene 2.6 in forty parts of a ten per cent. caustic soda-lye.

The dyestuff formed is precipitated by common salt, pressed and dried. It forms a black-violet powder with a metallic luster. It is soluble in water with blue-violet color and in sulfuric acid with a greenish-blue color. Muriatic acid added to the watery solution changes the color into red-violet and soda-lye into blue. The alkaline solution of the dyestuff is decolored by zinc-dust. It dyes directly unmordanted cotton blue.

What I claim as my invention, and desire to secure by Letters Patent, is—

1. The method of producing a new blue tetrazo dyestuff consisting in combining tetrazo diphenyl or ditolyl first with one molecule of amidoöxy-alpha-naphthalene-disulfo-acid in an alkaline solution and then with one molecule of dioxynaphthalene 2.6 dissolved in alkali.

2. As a new article of manufacture the blue dyestuff herein described which is a black-violet powder with a metallic luster, soluble in water with a blue-violet and in sulfuric acid with a greenish-blue color; muriatic acid changing the color of its watery solution into red-violet and soda-lye into blue; zinc-dust decoloring its alkaline solutions, substantially as set forth.

In testimony whereof I have signed my name to this specification in the presence of two subscribing witnesses.

CHRISTIAN RUDOLPH.

Witnesses:
JEAN GRUND,
ALVESTO S. HOGUE.